(12) United States Patent
Joshi et al.

(10) Patent No.: US 9,798,807 B2
(45) Date of Patent: Oct. 24, 2017

(54) ALGORITHMICALLY GENERATED TOPIC PAGES

(75) Inventors: Deepa Joshi, Sunnyvale, CA (US); Ingrid Lestiyo, Sunnyvale, CA (US); Mike Wexler, Santa Clara, CA (US); Ashish Shukla, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 1975 days.

(21) Appl. No.: 12/116,195

(22) Filed: May 6, 2008

(65) Prior Publication Data
US 2009/0282013 A1    Nov. 12, 2009

(51) Int. Cl.
*G06F 17/30* (2006.01)

(52) U.S. Cl.
CPC .... *G06F 17/30864* (2013.01); *G06F 17/3089* (2013.01)

(58) Field of Classification Search
CPC ............ G06F 17/30864; G06F 17/3089
See application file for complete search history.

(56) References Cited

U.S. PATENT DOCUMENTS

| | | | |
|---|---|---|---|
| 6,282,532 B1 | 8/2001 | Sandell | |
| 7,089,226 B1 | 8/2006 | Dumais et al. | |
| 7,133,870 B1 * | 11/2006 | Tripp et al. | 707/723 |
| 7,168,051 B2 | 1/2007 | Robinson et al. | |
| 7,363,302 B2 | 4/2008 | Lester | |
| 7,424,478 B2 * | 9/2008 | Licon et al. | |
| 2001/0034661 A1 | 10/2001 | Ferreira | |
| 2002/0113820 A1 | 8/2002 | Robinson et al. | |
| 2002/0120507 A1 | 8/2002 | Chanos et al. | |
| 2002/0156917 A1 | 10/2002 | Nye | |
| 2003/0036848 A1 * | 2/2003 | Sheha et al. | 701/209 |

(Continued)

FOREIGN PATENT DOCUMENTS

KR    10-2001-64265 A    7/2001

OTHER PUBLICATIONS

Long, NPL "Google Hacking for Penetration Testers", Jul. 2004, Syngress.*

(Continued)

*Primary Examiner* — Rehana Perveen
*Assistant Examiner* — Huen Wong
(74) *Attorney, Agent, or Firm* — Martine Penilla Group, LLP

(57) ABSTRACT

A method and system for generating a topic page for a search query on a search webpage includes receiving a query at the search webpage on a client. The query is transmitted from the search webpage on the client to a search engine on a server. A topic page generator available to the search engine analyzes the query to identify a plurality of dimensions. One or more content modules that match one or more of the dimensions are selected from a plurality of sources based on a weight associated with each of the content modules. The weight defines the ranking of a content module. The content modules for the plurality of dimensions are glued together and presented on the topic page in the order of the corresponding weight of the content modules. The order of presentation identifies the relevancy of the content modules to the query. The presented topic page provides the most relevant content modules for the query, and for a user located in a specific geo location.

33 Claims, 8 Drawing Sheets

(56) References Cited

U.S. PATENT DOCUMENTS

| | | |
|---|---|---|
| 2004/0205555 A1* | 10/2004 | Hind et al. .................... 715/513 |
| 2004/0267806 A1 | 12/2004 | Lester |
| 2005/0027705 A1* | 2/2005 | Sadri et al. ...................... 707/5 |
| 2005/0091111 A1 | 4/2005 | Green et al. |
| 2005/0149395 A1* | 7/2005 | Henkin et al. .................. 705/14 |
| 2005/0270311 A1* | 12/2005 | Rasmussen et al. .......... 345/677 |
| 2006/0005137 A1* | 1/2006 | Jolley ............................ 715/742 |
| 2006/0095331 A1 | 5/2006 | O'Malley et al. |
| 2007/0038567 A1 | 2/2007 | Allaire et al. |
| 2007/0162424 A1* | 7/2007 | Jeh et al. .......................... 707/2 |
| 2007/0185768 A1* | 8/2007 | Vengroff et al. ................ 705/14 |
| 2007/0226198 A1 | 9/2007 | Kapur |
| 2007/0250492 A1 | 10/2007 | Angel et al. |
| 2008/0046312 A1 | 2/2008 | Shany et al. |
| 2008/0215416 A1 | 9/2008 | Ismalon |
| 2010/0017289 A1 | 1/2010 | Sah et al. |
| 2010/0138452 A1 | 6/2010 | Henkin et al. |

OTHER PUBLICATIONS

Lutz, "Programming Python, 3rd Edition", Aug. 2006, O'Reilly Media.*

PCT International Search Report—PCT/US2009/002241 (dated Nov. 30, 2009) (3 pages).

* cited by examiner

ALGORITHMICALLY GENERATED TOPIC PAGES

CROSS REFERENCE TO RELATED APPLICATION

This application is related to U.S. patent application Ser. No. 12/116,198, entitled "Micro-Bucket Testing for Page Optimization," assigned to the assignee, which is incorporated herein by reference in its entirety for all purposes.

BACKGROUND

Field of the Invention

The present invention relates to internet searching, and more particularly, to generating topic pages through an algorithm that assembles contents in response to analyzing a search query.

Description of the Related Art

With the proliferation of information available on the internet, the internet has become an effective search tool. A search engine equipped with a search tool receives a query with one or more keywords, uses the keyword(s) to search a repository of information available to the search engine and returns a plurality of search results that match the search query. The search results are returned in the matching order of the keyword(s) with the highest amount of match being at the top. To narrow the search results, additional keywords may be used. Additional related pages, including online advertisements, are generated based on the matched keywords. This works well, when the query includes keyword(s) that are unambiguous or is location independent. However, when a query includes keyword(s) that are ambiguous, the search results returned may not reflect the true interest of the user, the true intent of the search query, or it may be hard to find relevant information due to large number of results. The search tool on the search engine, in this instance, uses an algorithm that is most likely based on historical click throughs to arrive at the search results page (topic page) that may include topics and search results not relevant to the search.

Generating topics for a search page takes lot of effort. For instance, each of the search result may be tagged for a particular topic. Such tagging is usually done manually as and when the search result content page is made available on the internet. With the constant streaming of information on the internet, such manual efforts may not be practical or viable. Further, for an ambiguous query, expected information from a search query in one geo location may be different from another geo location. For instance, a user looking for information on a simple search query, such as "Saturn", in America may be actually looking for information on "Saturn" cars and a user in India may be looking for information on the planet Saturn. In another instance, a user looking for information on "Eagles" in Philadelphia may be looking for information on a football team bearing the name while a user in Wisconsin may be looking for information on the bird, and a user in California may be looking for information on Eagle scouts.

It is in this context that embodiments of the invention arise.

SUMMARY

Embodiments of the present invention provide methods and computer implemented system that enable generating a topic page for search queries on a search webpage. The method employs a glue algorithm that identifies and brings together content modules and links to related pages for a plurality of dimensions for a specific geo location associated with the query. A query for a search is received at the search webpage on a client and transmitted to a search engine on a server. The query is analyzed at the search engine, to identify a plurality of dimensions. These dimensions identify categories that define a topic, one or more intents and a geo location for the query. The search engine uses the dimensions for the query to search a plurality of sources and to identify one or more content modules that match one or more of the dimensions. The content modules are selected based on a weight associated with each of the content modules. The weight of each of the content modules defines the ranking of the content module and is provided as part of metadata associated with the content module. The selected content modules are presented in a topic page such that the order of the modules on the topic page indicates relevancy of the content modules to the query. The topic page generated with the content modules provides search results that are relevant to the particular geo location associated with the query thereby eliminating unnecessary contents from being included in the topic page. Further, the weighting of the content modules ensures that only the most relevant content modules are returned in response to the query. The current embodiments enable automatic tagging of the content modules for future data mining.

It should be appreciated that the present invention can be implemented in numerous ways, such as methods or a system. Several inventive embodiments of the present invention are described below.

In one embodiment, a method for generating a topic page for search queries on a search webpage is disclosed. The method includes receiving a query at the search webpage on a client. The query is transmitted from the search webpage on the client to a search engine on a server. The search engine analyzes the query to identify a plurality of dimensions. One or more content modules that match one or more of the dimensions are selected from a plurality of sources based on a weight associated with each of the content modules. The weight defines the ranking of a content module. The content modules are presented on the topic page in the order of the corresponding weight. The order of presentation identifies the relevancy of the content module to the query.

In another embodiment of the invention, a method for generating a topic page for a search query on a search webpage is disclosed. The method includes requesting content modules for a query from a search engine. A query for a search is forwarded from a client to the search engine on a server. The search engine receives and analyzes the query to identify a plurality of dimensions that define the query and identifies the purpose of the query for a particular geo location. The search engine searches a plurality of sources to identify one or more content modules matching one or more of the dimensions. A topic page is generated with the identified content modules and is rendered on the search webpage in response to the query request. The topic page is analyzed to identify any conflicts associated with the one or more content modules rendered therein. Any conflict encountered at one or more content modules in the topic page are successfully resolved thereby enriching quality of the topic page rendered on the search results webpage.

In yet another embodiment, a system for generating a topic page for search queries on a search webpage is disclosed. The system includes a client with a user interface configured to receive a query and transmit the query to a search engine. A search engine on a server receives the query from the client, processes the query, generates a topic page with a plurality of content modules matching the query and returns topic page to the client for rendering. The user interface on the client is also configured to render the topic page and to capture and transmit user interactions at one or more content modules on the topic page. The search engine includes a topic page generator for generating a topic page for the search query. The topic page generator includes a plurality of modules including a categorizer module, a module selector and a module placer. The categorizer module is configured to analyze the query and identify a plurality of dimensions associated with the query. The dimensions include a topic, one or more intents defining the purpose of the query and a geo location for the query. The module selector is configured to select one or more content modules from each of a plurality of sources that match the one or more of the dimensions identified by the categorizer module. The module placer is configured to identify the placement of each of the content modules in the topic page. To assist in the placement of the content modules, the module placer uses metadata associated with the content modules. The rendered topic page includes content modules that are relevant to the search query for the associated geo location.

Thus, the embodiments of the invention provide a tool to customize search result webpage to reflect the true purpose of the query based on topic, intent and geo locations for the query and to automatically tag content pages accordingly as and when they are available on the internet so that mining of information may be efficiently managed.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and computer implemented systems that enable generating a topic page in response to a search query on a search webpage. A query is received at the search webpage from a user interface on a client. The query is forwarded to a search engine on a server. The query is received at the server and analyzed at the search engine by a topic page generator. It should be understood that the topic page generator can be in the form of a code running on a server, and does not have to be integrally coupled to the search engine logic. A plurality of dimensions are identified for the query. One or more content modules from a plurality of sources, matching one or more dimensions of the query, are identified. The content modules are selected from a plurality of sources based on a weight associated with the content modules. The weight of each content module is provided as metadata and identifies a ranking of the content module. A topic page is generated using the content modules with the order of the content modules based on the corresponding weight of each of the content modules. The order of the content modules indicates the relevancy to the search query for a particular geo location. The resulting topic page is, therefore, automatically glued together to target the most logical or possible intent of a glue user.

By analyzing the query to identify the various dimensions associated with a search query, only relevant content modules that match one or more dimensions are returned glued together in the topic page. The embodiments, thus, provide a tool for optimizing search results thereby enriching the quality of the topic page returned to the search results webpage. Further, the embodiments allow for customization of the topic page by actively tracking user interaction at each of the content modules in the topic page. The user interactions are used to dynamically weigh the content modules and the topic page is reconfigured to reflect the current weight of the content modules. The embodiments address ambiguity of some queries by identifying the appropriate dimensions of the search query and returning content modules that are related to the dimensions of the search query. The reconfiguration of the topic page and refining of the search by using the weight of the content modules enriches the quality of the search results while providing the most relevant content modules for the query and for a particular user located in a particular geo location.

Figure 1:
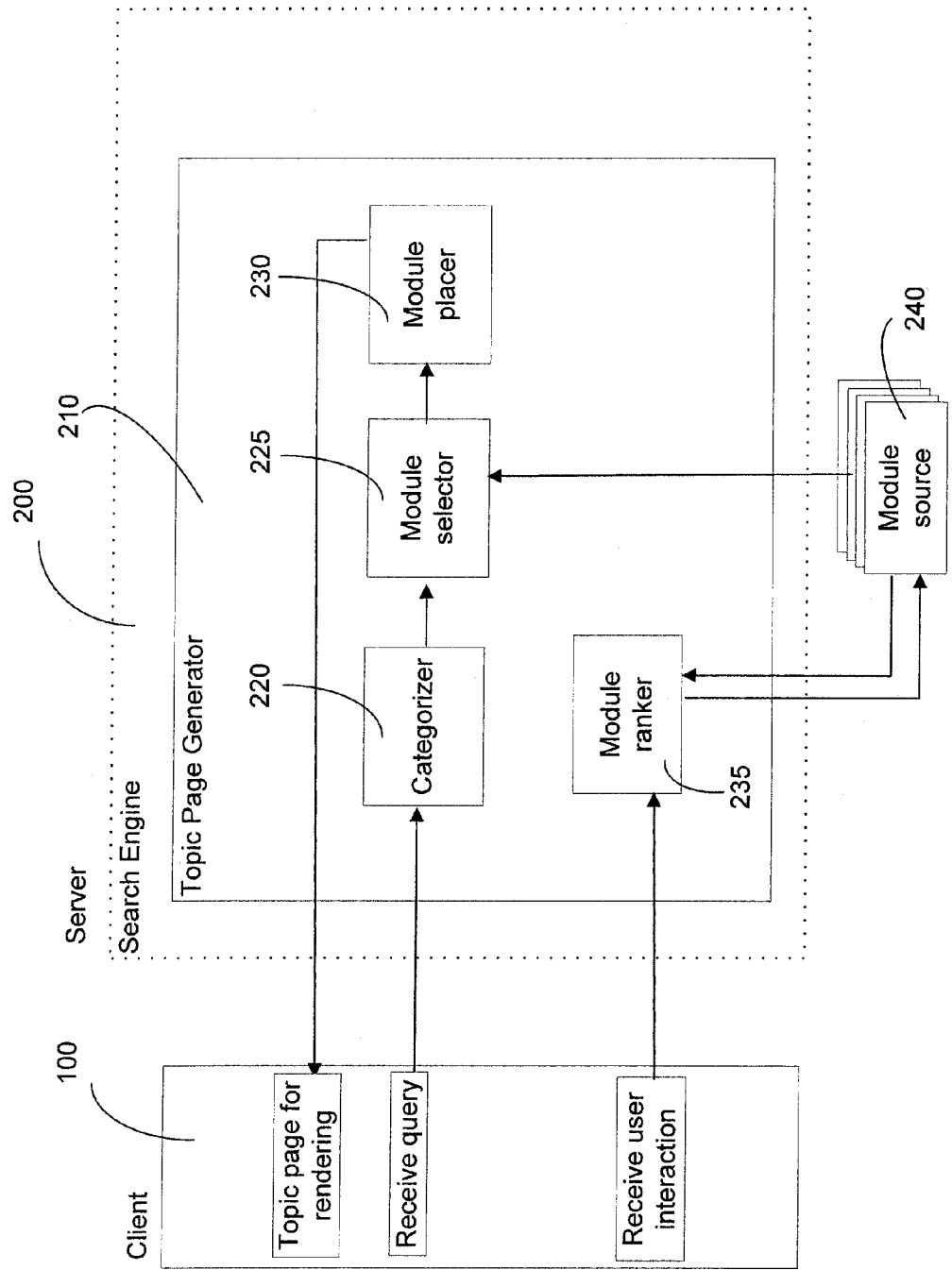
FIG. 1 illustrates a high-level block diagram of a system used in generating topic page for a plurality of dimensions, in accordance with one embodiment.

FIG. 1 illustrates a high-level block diagram of various functional elements of a computer system used in generating a topic page for a search query on a search webpage, in one embodiment of the invention. It should be understood that this is only an exemplary system, and should not be considered limiting. Other forms may also be possible, so long as the logic in processing can be carried out to generate the topic pages.

The system, as shown in FIG. 1, includes a client 100 with a user interface to receive and transmit a search query. The user interface is communicatively connected to a server 200 through a computer network (not shown), such as the Internet. The connection may be wired or wireless and may use any technology that allows the user interface to interact with the search engine. The user interface is also used to render a topic page with one or more content modules that is returned in response to the search query and to capture user interactions at one or more of the content modules rendered on a search webpage at the client 100.

The server 200 includes a search engine to receive the search query (query) from the client 100, search one or more sources 240 available to the search engine through the network to identify and select a plurality of content modules matching the query, generate a topic page with the selected content modules and return the topic page to the user interface at the client 100 for rendering. The one or more sources 240 on the network interact with the search engine to exchange information related to the query. The content modules identified and returned by the search engine may include one or more of textual information, audio content, video content, graphic images, or any other type of content that can be rendered on the search results webpage. In addition to various factual and informational contents, the content module may include sponsored advertisements from a plurality of sources that are relevant to the search query and the sponsored advertisements may, in turn, include audio, video, graphic or any other form of content that can be rendered on the webpage.

A topic page generator 210 available to the search engine on the server 200 receives the query from the search engine and interacts with one or more sources 240 available to the search engine to identify and retrieve one or more content modules and generate a topic page using the content modules that match the query. The topic page generator 210 may be integrated within the search engine or may be distinct from the search engine and may be available to the search engine for processing. The topic page generator 210 includes a plurality of modules, such as a categorizer module 220, a module selector 225, a module placer 230 and a module ranker 235. The categorizer module 220 receives the query and analyzes the query to identify a plurality of dimensions. Some of the dimensions identified by the categorizer module 220 include a topic, intents and a geo location associated with the query. It should be noted that the geo location, as used in this application, encompasses three aspects of location—a website location, a user location and a query geo location. A website location is the site used to initiate the query. For instance, when an Indian website, in.search.yahoo.com, is used for the query the website location would be India. For a Mexican website, telemundo.yahoo.com, is used for the query, the website location would be Mexico, etc. A user location is a location from where a user initiates the query, i.e. where the user is based. For instance, for a user in Sunnyvale, Calif., U.S.A., using Mexican website, the user location is Sunnyvale, Calif., U.S.A. A query geo location is a location of the subject matter of the query. For instance, a query, "Aishwarya Rai," (a popular Indian actress) has a query geo location of India while a query "Matt Damon" (a popular American actor) has a query geo location of U.S.A. Thus, the geo location uses all three aspects of location to determine the appropriate geo location associated with the query. The categorizer module 220 may associate weights to the three aspects of location and determine the geo location based on the weight. In one embodiment, the categorizer module 220 may weigh the website location and the query geo location higher than the user location and the geo location for the query is a combination of the website location and query geo location. In another embodiment, all three aspects of location are considered and based on the associated weight, the geo location of the query is determined. In yet another embodiment, the query geo location is weighed higher than the website location and the user location, and the geo location associated with the query is determined to be the query geo location.

In addition to the geo location, the categorizer module identifies a topic of interest for the query. The query may encompass a plurality of topics of interest. For instance, an ambiguous query, such as "Saturn", may be associated with both automobile category and the astronomy-science category. The automobile category may be the preferred subject matter in one geo location while the science-astronomy category might be preferred in another geo-location. In another instance, a query, such as "Eagles", may result in a plurality of topic categories, such as entertainment-music (associated with the Eagles rock-band), entertainment-sports (associated with the Philadelphia Eagles football team) and Science (associated with the bird Eagle). The query, in this instance, may be for information on the football team, the bird or the rock-band group depending on the geo location associated with the query. Thus, by identifying the geo location of the query, relevant topic category may be identified and appropriate content modules selected for rendering on the search results webpage. Further, based on the popularity of the topic in geo location appropriate content modules and other related content modules may be selected for rendering.

The categorizer module further identifies one or more intents for the query. The intents define the purpose of the query for the topic at a particular geo location. For instance, the intent of the query, Saturn, in a geo location, such as India, may be associated with request for information about the planet, its moons, an astronomical event associated with the planet, etc. Some of the intents that may be identified include general information, breaking news, shopping, local happenings, specials, etc., for a topic at a specific geo location. By identifying the relevant intents of the query for a topic at a geo location, the search results may be refined to obtain relevant content modules that satisfy the query requirements making the search results richer in quality and relevant in content.

Once the plurality of dimensions are identified for the query, the module selector 225 uses the dimensions to identify one or more content modules from a plurality of sources 240 that are available to the topic page generator for relevant topic and select the identified content modules for rendering on the search results webpage. The plurality of dimensions is ranked based on the geo location. The dimensions are ranked based on knowledge of the prior user interactions at the content modules associated with the corresponding dimensions. User logs, session logs and query logs provide the information to rank the dimension in each geo location. The module selector accesses the appropriate repository, such as a module gallery, at each of the plurality of sources associated with the identified geo location to select the content modules relevant to the topic and intents of the query. The content modules are stored in the module galleries based on the geo locations and topic. Each of the content modules includes metadata defining the contents within the content module. In addition to information defining the contents within the content module, the metadata includes one or more rendering attributes that are used for rendering the content modules. The rendering attributes include a weight associated with the content module that is used to rank and place the content modules in a topic page. The weight of the content module includes weights associated with each of the plurality of dimensions and the ranking of the content module in a topic page is based on the overall weight from all the dimensions. The content modules are selected based on the highest overall weight of the content module. It should be noted that the sum of the weights of the content modules for each dimension of the query is equal to 1. For instance, since only one geo location is considered for a query, the overall weight for the geo location dimension is 1. Similarly, when a plurality of topics are associated with a query, each of the topic may be weighted based on the popularity of the topic at the geo location and the sum of all the weights for all the topics is equal to 1. A sample weight excerpt for each of the topics for the query "Saturn" in the geo location U.S. is enclosed in

TABLE A saturn 1. business and finance
    Score = 0.699887034015313
    Related Terms
    2007 saturn view cars
    saturn
    www.saturn.com
    saturn.com
    saturn cars
    Directory Categories
    Automotive Makers > Vehicles
2. technology and science/science
    Score = 0.289485795573407
    Related Terms
    pictures of saturn the planet
    planet saturn
    rings of saturn
    saturn
    information about the planet saturn
    nine planets
    saturn's rings
    Directory Categories
    Planet Saturn
3. technology and science
    Score = 0.0106271704112799
    Related Terms
    nasa
    titan
    saturn
    cassini
    cassini huygens
    Directory Categories
    Cassini-Huygens: Mission to Saturn and Titan.

The content modules from a plurality of dimensions are combined to match the query. The weight of the content modules under each of the plurality of dimensions is considered during the selection of the content modules.

The module placer 230 obtains a list of content modules selected by the module selector 225 and generates a topic page with the selected content modules. The module placer uses the rendering attributes in the metadata associated with each of the content modules to define the placement of the content modules in the topic page. Some of the metadata that are used in placing the content module includes display size, preferred location, location where the content should not be placed, content type, author, source, weight and display flag. The weight of the content module defines the relevance of the content module with respect to a query and is used in ranking the content module. The module placer uses the weight of each of the content modules and the rendering attributes to define the order in which the content modules are placed in the topic page. The module placer tries to keep ranking of modules same as far as possible. The location of sponsored module may be fixed. The topic page defined by the module placer is returned to the search results webpage at the client 100 for rendering.

In addition to the categorizer module 220, the module selector 225, and the module placer 230, the topic page generator 210 includes a module ranker 235 to define the weight of the content modules. The weight of the content modules describes the associated ranking of the content modules. The module ranker interacts with the plurality of sources 240 to rank the content modules based on one or more weighting attributes. Some of the weighting attributes that are considered in the weighting of the content module includes credibility of a source providing the contents for the content module, relevancy of a source with respect to one or more dimensions, quality of content within the content module, and frequency of updates to the content within the content module. The module ranker interacts with the user interface at the client to obtain one or more user interactions. The user interactions may redefine one or more weighting attributes. For instance, a user interaction may result in the reconfiguration of the topic page due to rearranging of one or more content modules and the reconfiguration may change the relevancy of the content modules thereby affecting the weight of the corresponding content modules. The affected weighing attributes are used to dynamically adjust the weight of the corresponding content modules and to update the associated metadata. In another instance, the content module may be deleted from the topic page. In this instance, the content module weight may be adjusted and the display flag status may be updated to reflect the change. The updated weighting attributes of the affected content modules is stored in the metadata and is used by the module placer during the placement of the content modules in the topic page returned to the search results webpage. The topic page is then rendered on the search results webpage based on the updated weight. The rendered topic page provides quality content modules with most relevant contents for the topic of the query.

Figure 2:
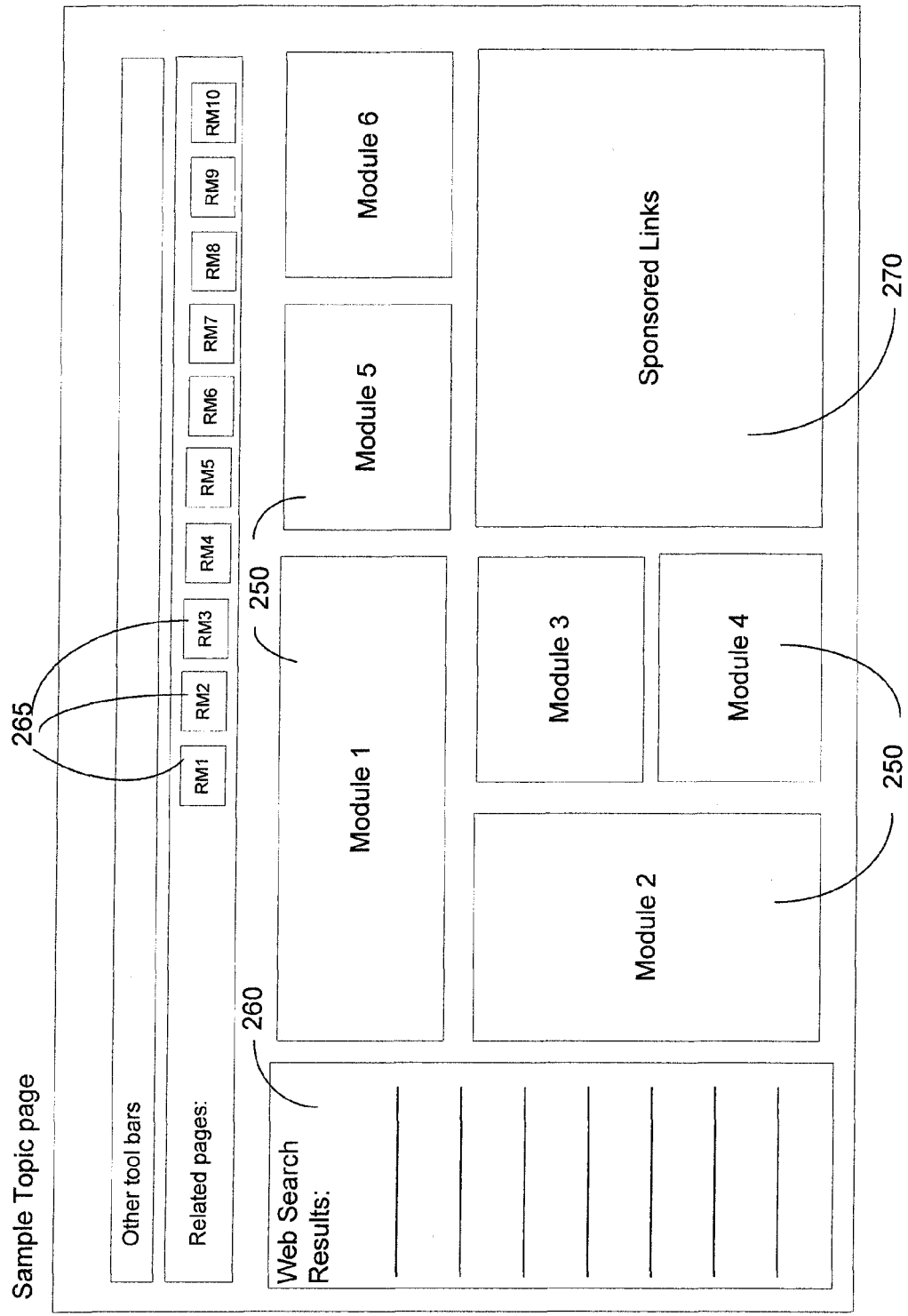
FIG. 2 illustrates a sample block view of a search results page with a plurality of content modules and links to related pages, in accordance with one embodiment.

FIG. 2 illustrates a simplified block representation of a sample topic page rendered on a search results webpage. The topic page includes a plurality of content modules 250, modules 1-6, of varied sizes and contents that match the a topic of the query but more than one intent for a geo location. A list of search results 260 for one or more topics associated with the query is shown on the left side of the topic page. Additional topics may be suggested in a disambiguation navigation bar (not shown). A plurality of links to related pages 265, RM1-RM10, for the relevant topic is also provided in the form of a navigation bar on the topic page. The topic page illustrated in FIG. 2 is representative of a typical search results page with other navigation tool bars available for navigating through the content modules available on the topic page. One or more sponsored links 270 associated with the topic of the query are also provided.

Figure 2A:
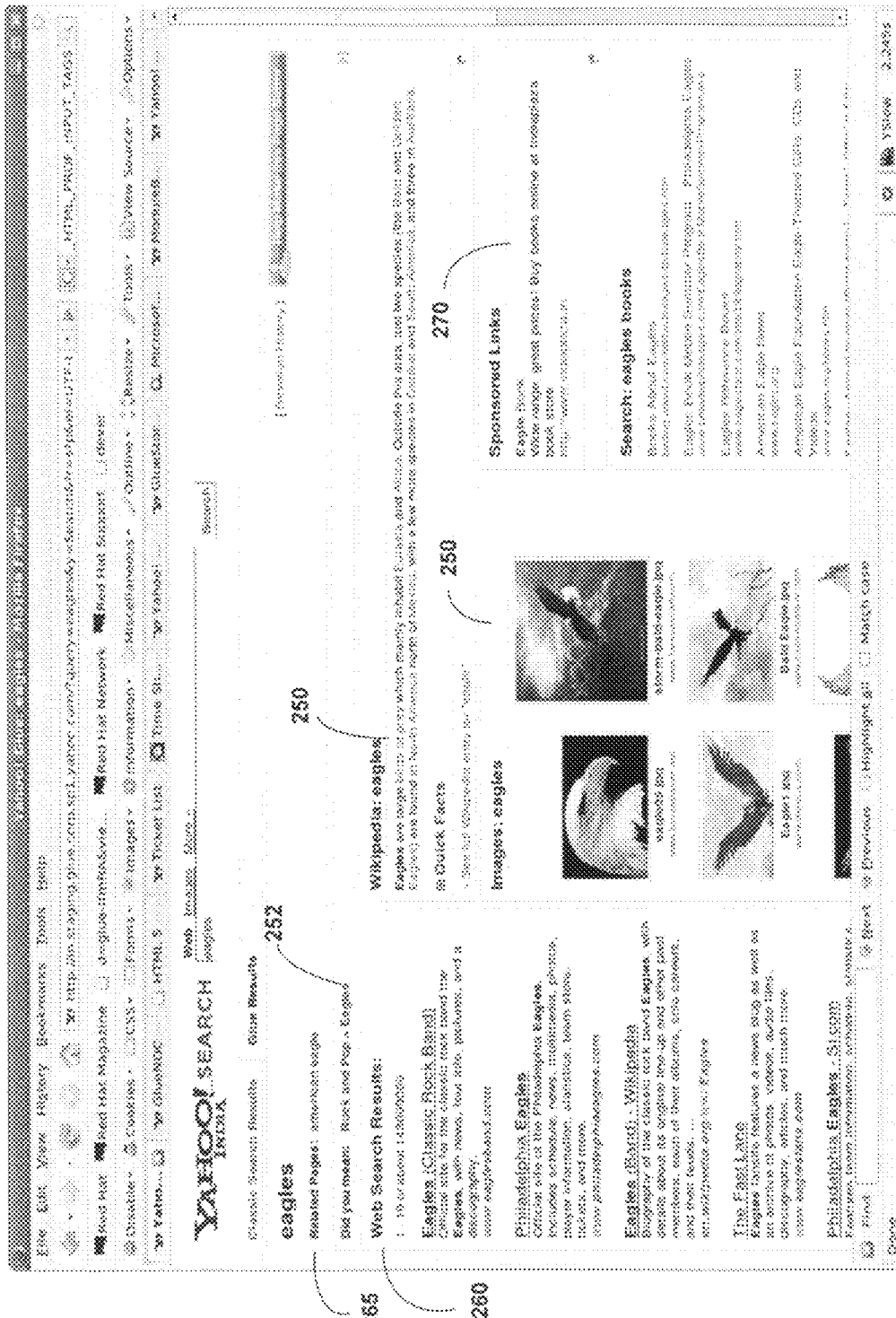
FIGS. 2A and 2B illustrate sample topic pages with relevant content modules associated with a topic at different geo locations, in one embodiment of the invention.
Figure 2B:
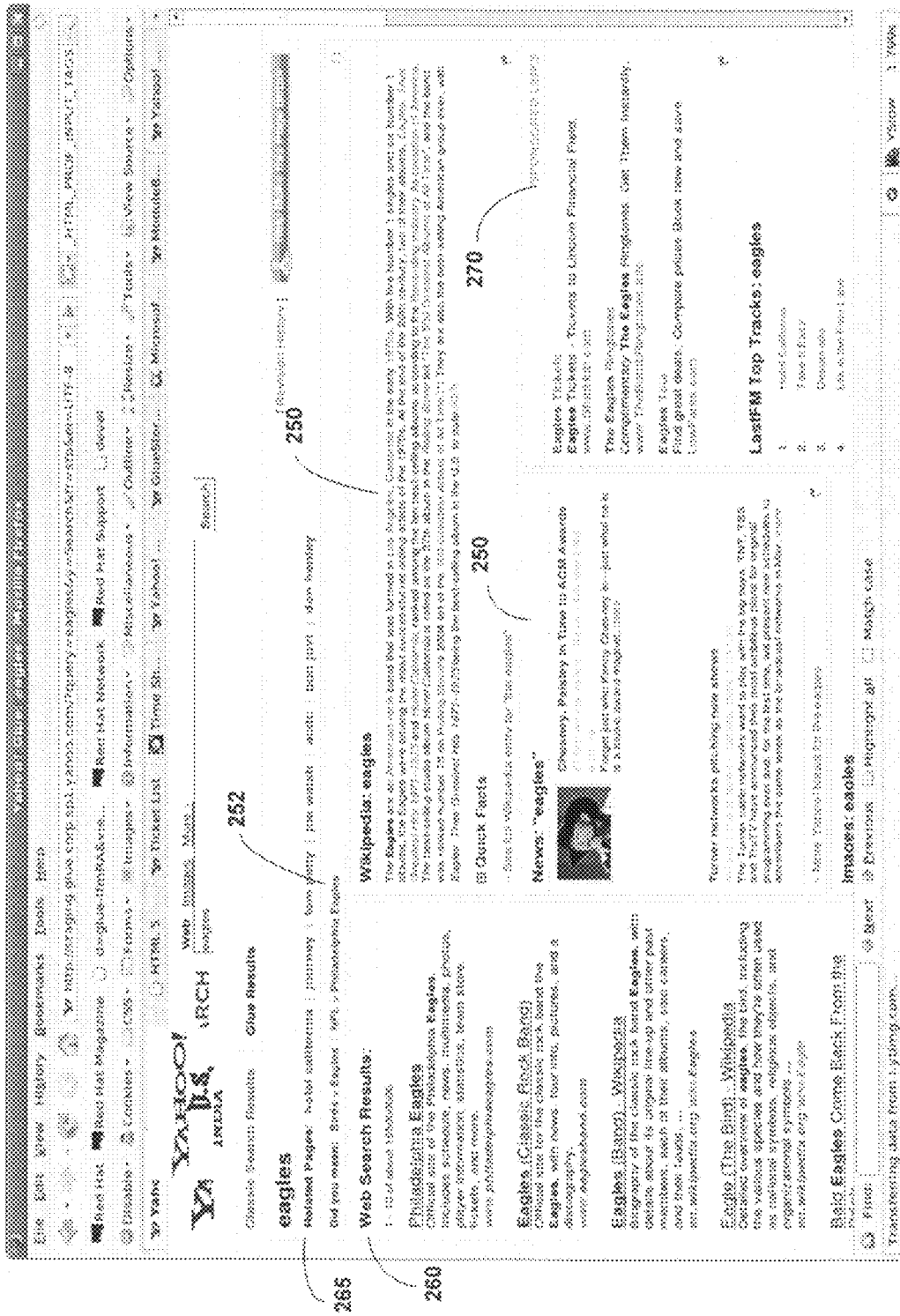

FIGS. 2A-2D illustrate a snapshot of typical search results page obtained using embodiments of the invention. FIGS. 2A and 2B illustrate a topic page for a simple but ambiguous query, such as "Eagles", for different geo locations. As can be seen in FIG. 2A, the query is analyzed and a plurality of dimensions associated with the query is identified. The plurality of dimensions identified from the query include a topic dimension of science as being popular at the geo location, India, and the appropriate content modules are returned in the topic page. Aside from the content modules, a list of search results returned on the topic page is associated with a plurality of topic dimension identified for the query "Eagles" including the preferred topic, such as sports and entertainment-music, science-astronomy, etc. Along similar lines, a disambiguation navigation bar 252 in the topic page identifies alternate topic dimensions available for the query. Similarly, the links to related pages returned in response to the query are associated with the topic that is most relevant for the geo location associated with the query.

FIG. 2B illustrates a topic page for the query referenced in FIG. 2A for an alternate geo location. In this embodiment, the same ambiguous query referenced in FIG. 2A is analyzed to identify the plurality of dimensions associated with the alternate geo location. The other dimensions associated with the query are identified based on the identified geo location thereby resulting in a topic and intents that is popular in the identified geo location which is different from the topic and intents for the geo location referenced in FIG. 2A. The content modules returned are related to the identified dimensions, based on the popularity of the dimensions at the geo location. Just like the search results, a disambiguation navigation bar 252 in the topic page identifies alternate topic dimensions available for the query. As illustrated in FIG. 2B, the content modules that are identified and selected for the geo location associated with the query are for geo location Philadelphia with the popular topic being identified as entertainment-sports for the geo location.

Figure 2C:
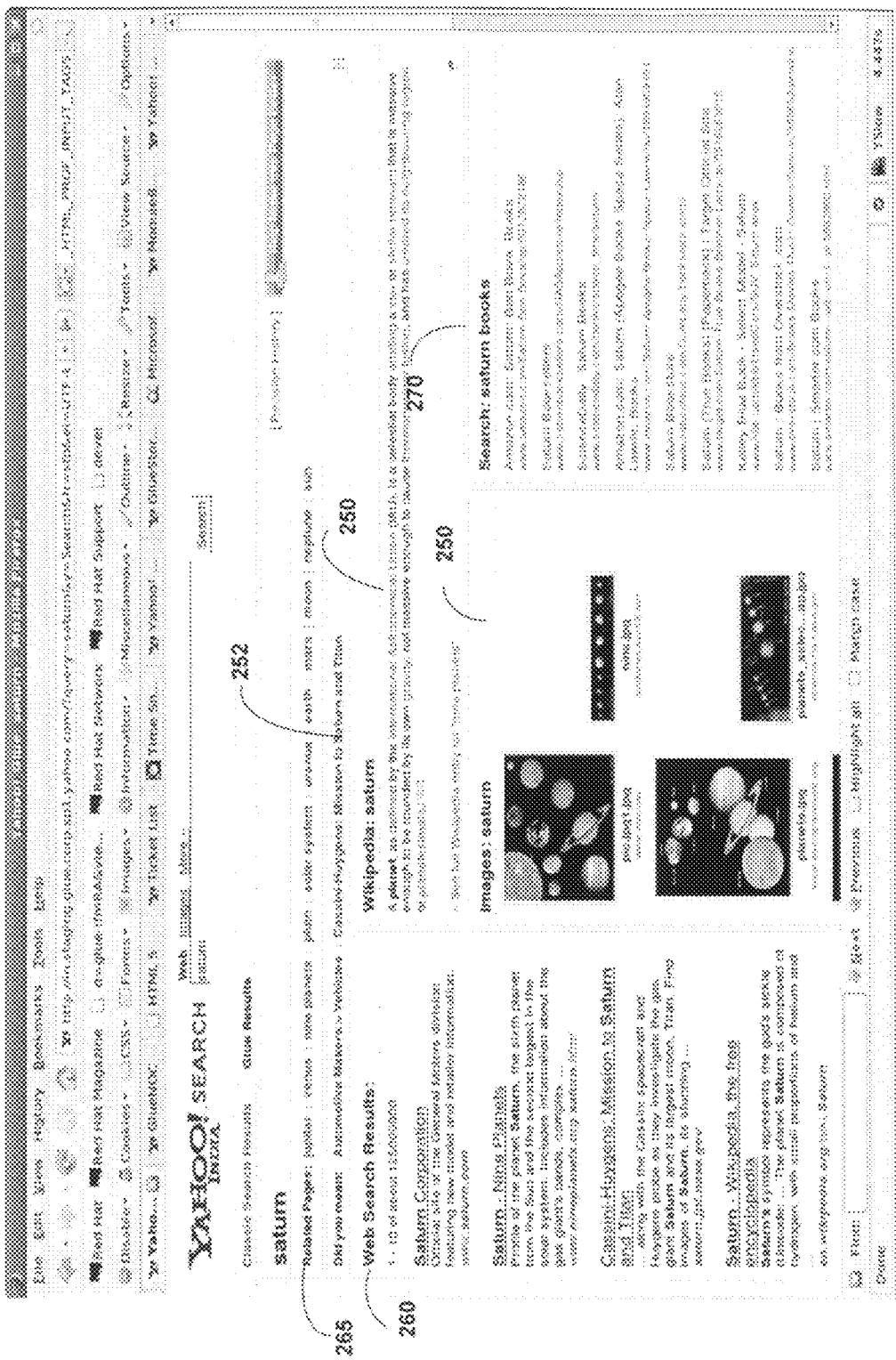
FIGS. 2C and 2D illustrate sample topic pages with relevant content modules associated with a topic at different geo locations, in one embodiment of the invention.
Figure 2D:
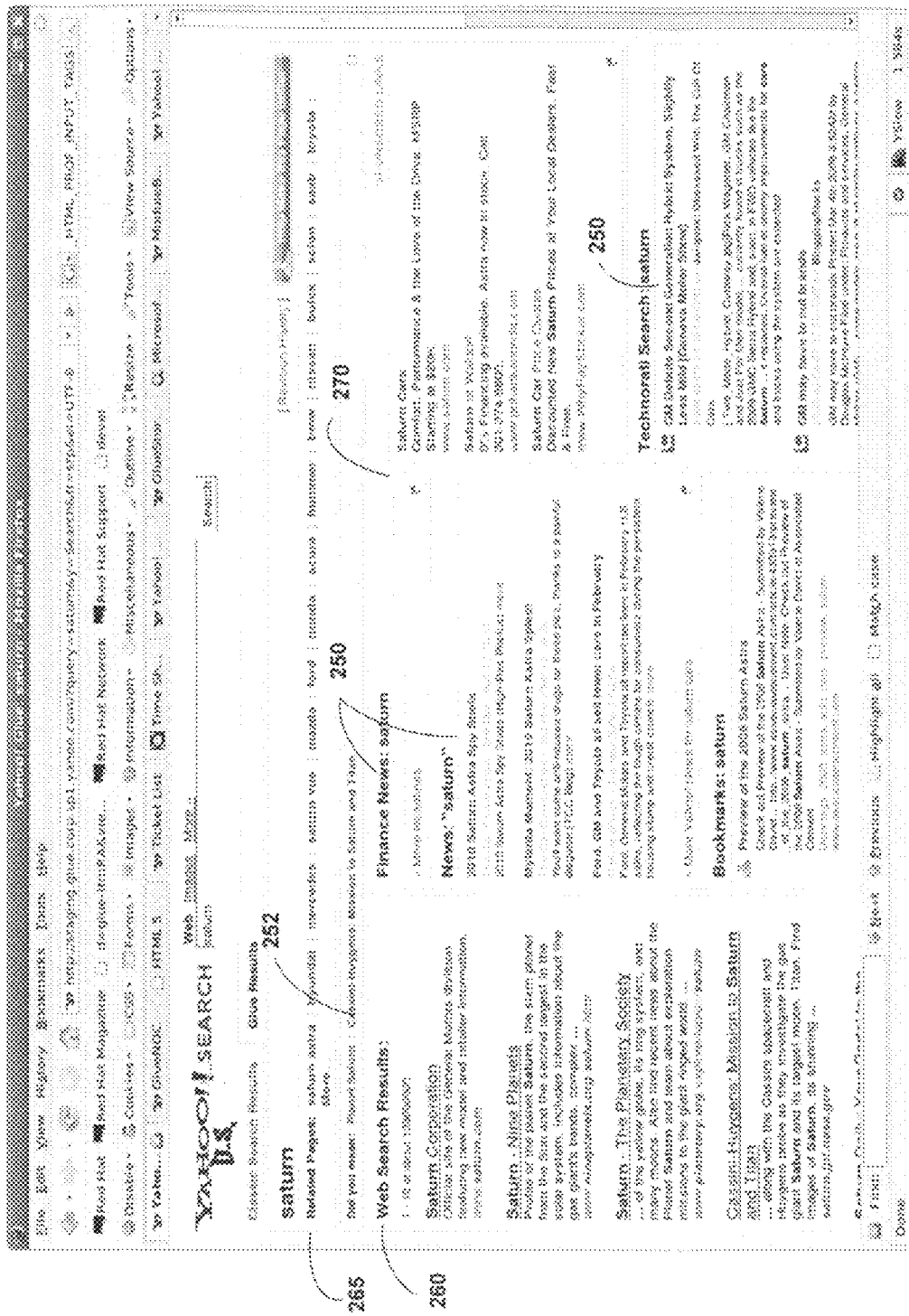

FIGS. 2C and 2D illustrate a topic page for another ambiguous query that is distinct from the one illustrated in FIGS. 2A and 2B. As shown in FIG. 2C, a simple query "Saturn" is received and analyzed at the server to identify the geo location as India and the most popular topic for the geo location as Science-astronomy. It should be noted that when a query is analyzed, the analysis identifies one geo location for the query, one topic popular or commonly searched at the geo location and one or more intents for the identified topic. Upon identifying the geo location, one topic associated with the query is identified along with one or more intents to further refine the search to obtain the most relevant content modules 250 for the query. The geo location is identified based on the subject matter of the query and the topic and intents are identified based on the subject matter at the geo location. The intents are used in further refining the search. The content modules are stored at a plurality of sources in repositories, such as module galleries, and the corresponding metadata is used for selecting the content modules that match the one or more dimensions. Thus, when a query, such as "Saturn", is received, the module selector at the search engine identifies the most popular topic at the geo location and uses the metadata of the content modules to identify the appropriate content modules that match the topic and intents associated with the query for the geo location. If more than one topic is equally popular at the geo location, then the content modules for each of the topics are identified and returned. A plurality of search results and an disambiguation navigation bar identify alternate topic dimensions available for the query.

In addition to the content modules for an identified topic(s), additional topics may be identified and used in selecting one or more search results and sponsored results for the topic popular or commonly sought at the geo location. The sponsored results, such as advertisements, that are included in the topic page are tailored for the identified geo location. As shown in FIG. 2C, the topic page returned to the search results webpage includes search results illustrated in the web search results box 260 for a topic popular or commonly sought at the geo location, sponsored search results box 270 tailored for the identified geo location, a disambiguation navigation bar 252 identifying alternate topics available for the query and a plurality of content modules 250 for the identified topic. The content modules are presented in the topic page in an order defined by a weight associated with the content modules. The topic page also includes a plurality of links to related pages for the specific topic, as shown in the navigation bar 265. The topic page illustrated in FIG. 2C is shown for the geo location, India.

FIG. 2D illustrates a topic page for the same query, "Saturn", received at an alternate geo location, such as California, United States. As can be seen, the most popular search topic for the geo location of California for the query "Saturn" is automobile and the content modules, search results, links to related pages and sponsored advertisements are selected accordingly. Thus, based on specific geo locations, the relevant topic and intents are identified and the search is refined to identify appropriate content modules based on the intents for the relevant topic within the geo location so that the returned content are richer in quality and more relevant to the query at the geo location as can be evidenced by the search results returned in FIG. 2D.

Figure 3:
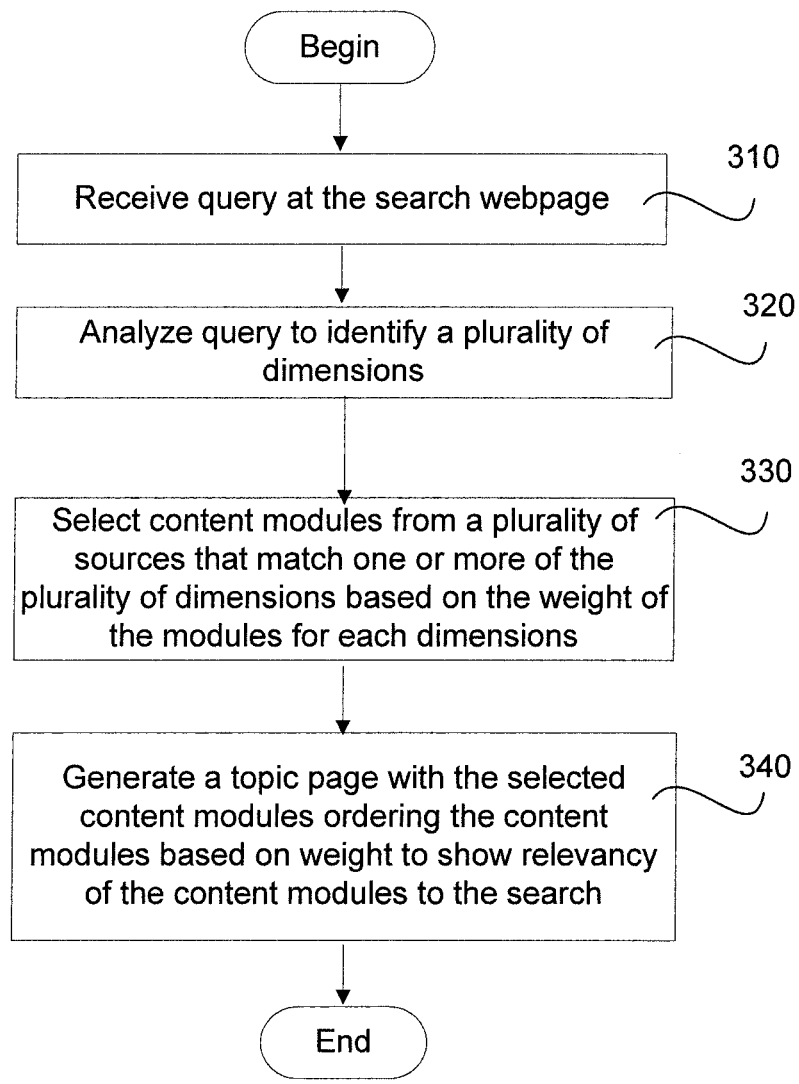
FIG. 3 illustrates a flow chart of process operations involved in generating a topic page for a search query, in accordance with one embodiment of the invention.

With the above general understanding of the various embodiments, a method for generating a topic page for a search query on a search webpage will now be described in detail. FIG. 3 illustrates the various process operations associated with the generation of the topic page. The method begins when a search query is received at a search webpage, as illustrated in operation 310. The query is received through a user interface and is transmitted to a search engine on the server for further processing. A search engine on the server receives the query and forwards the same to a topic page generator. A categorizer module within the topic page generator analyzes the query and identifies a plurality of dimensions associated with the query, as illustrated in operation 320. The categorizer module receives the query and analyzes the query to first identify a geo location associated with the query. The geo location may or may not be the location from where the query originated but is related to the subject matter of the query. After identifying the geo location, a topic for the query and one or more intents for the topic of the query are identified.

A plurality of content modules from various sources that match one or more dimensions are identified and selected, as illustrated in operation 330. The content modules are selected based on identified topic and the associated intents. The topic of the content module is determined using an algorithm within a module selector, the logic of which is described herein. When a website is generated for a particular product, service or event, the website or a webpage within a website associated with a particular topic, is assigned a space ID to identify the website. For instance, Wikipedia™ is assigned a space ID and topic pages (i.e. webpages within the website that is associated with particular topics) within the Wikipedia™ website, such as "Britney Spears" or "cricket", each have a space ID different from the space ID for Wikipedia™. The space IDs may be associated with a webpage shown in search results and if available, they are logged when a user clicks on a search result.

The space ID is stored in a taxonomy directory that is available to the module selector within the topic page generator in the search engine during a search. The space ID is stored as a node under a "category node". Each category node also has a space ID. For example: 8650401 may be a space ID that may be clicked when people search for "cakes" and this space ID is under category node "Society and Culture>Food and Drink>Cooking>Recipes". The parent of this node is "Society and Culture>Food and Drink>Cooking," which has a space ID of its own. The assignment of space ID to a topic in the taxonomy directory is done manually, automatically or semi-automatically. Each Space ID in the taxonomy directory for a website is usually mapped to a topic category.

When a search query is received at the search engine and the dimensions are identified, the search engine uses the taxonomy directory to obtain the space ID of the content module associated with the website based on a match of the topic from the query with the topic associated with the website. The topic associated with the query is defined using the following algorithm.

All user clicks for a query at search results webpage are collected. For each user click at a search result, it is determined if there is a corresponding space ID logged for the URL of the search result. If there is no corresponding space ID associated (i.e., there is no topic associated with the query that is mapped to the space ID), the clicked URL is used to find out the space ID. For example, in one embodiment, for a query, such as "folic acid," a user may click on a URL, "www.*nlm.nih.gov*/medlineplus/folicacid.html". If this URL has an associated space ID, then this space ID is used to determine the topic for the query. If not, a directory tree with this URL as a leaf is used in determining the space ID for the query. The directory tree is then traversed up to the next parent node and the process is repeated till a URL with the space ID is located on this directory tree. For instance, in the above example, the parent node of this URL, www.*nlm.nih.gov*/medlineplus/, is used to determine a topic for the query. A weight is associated with each clicked URL. In one embodiment, the weight assigned to the clicked URL depends upon how many sub paths were removed from the originally clicked URL to obtain the space ID. For instance, if the original node URL in the above example, www.*nlm.nih.gov*/medlineplus/folicacid.html, has an associated space ID, the weight assigned to this URL could be 1, as compared to the weight of the parent URL with space ID, www.*nlm.nih.gov*/medlineplus/, which might be assigned a weight of 0.5 and the URL, www.*nlm.nih.gov*/, could be assigned a weight of 0.33.

It should be noted that various clicked space IDs may belong to various category nodes in a taxonomy directory. For example, clicked space IDs for folic acid, in the above example, may belong to "Health>Nutrition>Nutrients>Vitamins>Vitamin B9 (Folic Acid)", "Health>Reference>Medline", "Reference>Encyclopedias", etc. Each of these category nodes in the taxonomy directory will be mapped to a module taxonomy using a mapping file. The mapping file may be generated automatically or manually. In the above example of folic acid, "Health>Nutrition>Nutrients>Vitamins>Vitamin B9 (Folic Acid)" may map to "/lifestyle/health", "Health>Reference>Medline" may map to "/technology and science/health", and "Reference>Encyclopedias" may map to "/information and reference". Each category in module taxonomy gets a score based on total weight of clicked space IDs that map to the category. In the above example, more than one space ID will get mapped to the category, "Health>Reference>Medline" and "Health>Diseases and Conditions>Birth Defects" and both these categories get mapped to module taxonomy category "/technology and science/health". The module taxonomy with the highest score gets selected as topic category for the query, which in the above example may be "/technology and science/health".

Referring back to FIG. 3, the selected content modules associated with the identified topic for the geo location are ranked based on weights associated with the content modules. A topic page is generated with the selected content modules. The order of the content modules in the topic page depends on the associated weight. The process concludes with the generated topic page being presented to the client for rendering, as illustrated in operation 340. The rendered topic page provides content modules that are rich in quality and contents that are most relevant to the query for a geo location. Even ambiguous queries result in content modules that are relevant to the search query with contents closely matching the most likely intents of the query thereby making the search more efficient and results more relevant. Although the content modules presented in the topic page reflect the most likely intents of the query, pointers to other possible intents are provided through an ambiguous query navigation tool.

Figure 4:
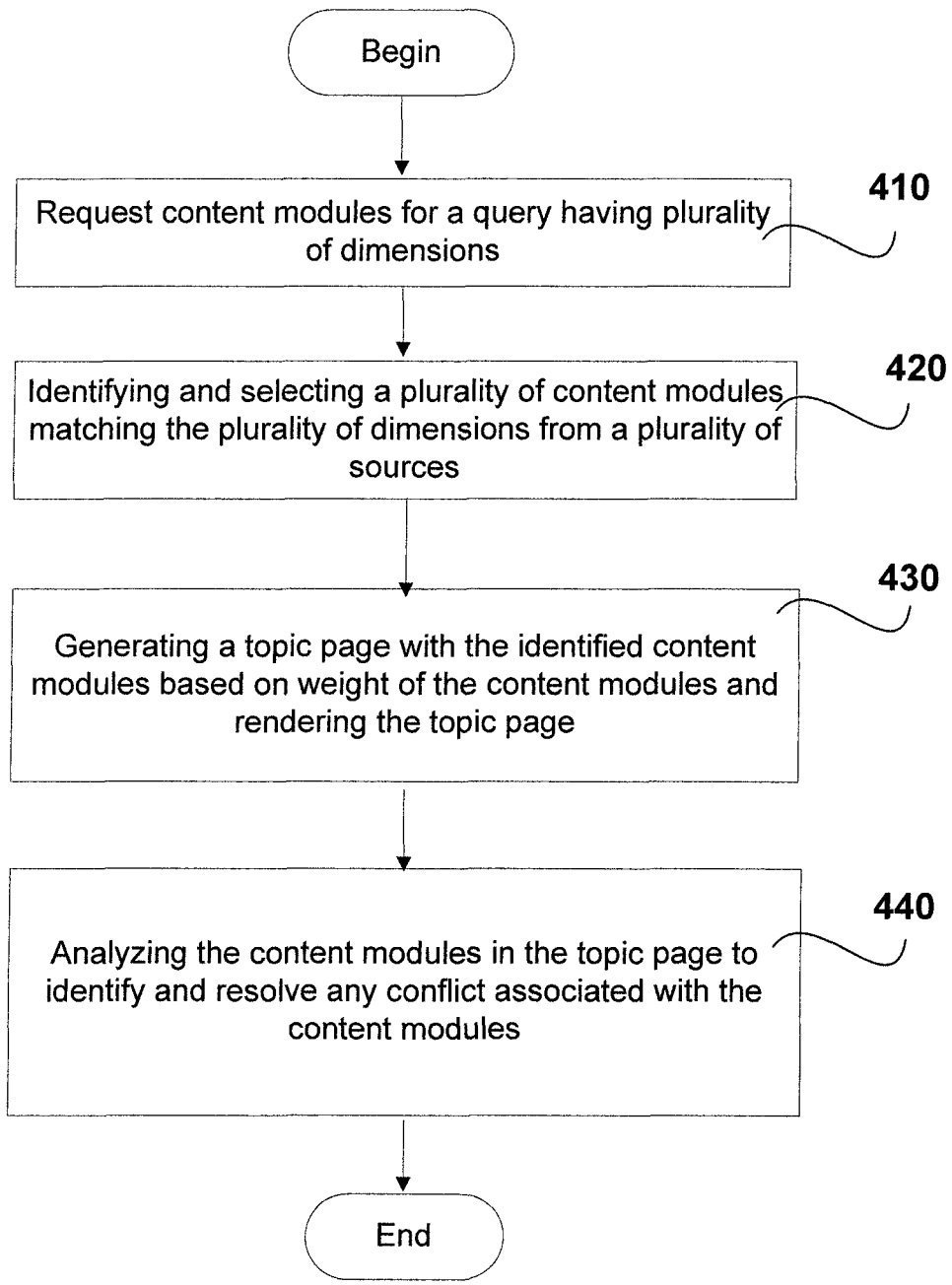
FIG. 4 illustrates a flow chart of process operations involved in generating a topic page for a search query, in accordance with an alternate embodiment of the invention.

FIG. 4 illustrates the various process operations used in generating a topic page for a query on a search results webpage, in an alternate embodiment of the invention. The process begins at operation 410 wherein a search query request for content modules is received at a search engine on a server. The search query request is obtained through a user interface and forwarded to the server. A search engine on the server receives the query and uses a topic page generator to analyze the query and identify a plurality of dimensions, such as a geo location associated with the query, a topic popular at the geo location and one or more intents for each of the topic. The topic page generator at the search engine searches a plurality of sources available to the search engine to identify a plurality of content modules that match one or more dimensions identified during the analysis of the query for the geo location associated with the query. In addition to the content modules, a plurality of search results, links to related pages and sponsored advertisements are also identified for the identified topic.

The identified content modules are selected from the plurality of sources, as illustrated in operation 420. The selected content modules are returned as a list that is ordered according to the associated weight. The weight defines the ranking order of the content module for the topic at the geo location for the query. The weight and, hence, the ranking of the content modules is based on a set of weighting attributes associated with each of the content modules. Some of the weighting attributes that are used for determining the weight of the content modules during the initial selection include credibility of a source supplying the contents for the content module, relevancy of a source with respect to the topic, quality of content and the frequency of updates of the contents at the source for the respective topic. Upon selecting the relevant content modules, the weight of each of the content modules is re-calculated using additional weighting attributes that define the popularity of the content modules with respect to the query. The additional weighting attributes considered for calculating the weight of the content modules are obtained through statistical data. The statistical data is obtained by tracking user interactions at each of the content modules which are captured in user logs, session logs and query logs. The statistical data from these logs provide information on type of user interaction occurring at each content module, number of user interactions with a content module and number of times a content module gets included in a topic page. The type of user interactions that may be captured by the user, session and query logs may include addition of a new content module, deletion of a presented content module and re-arranging of the presented content modules. These user interactions provide customization capability to the content modules on the topic page so that the resulting topic page is rich in quality and content. The re-calculated weight is updated in the metadata describing the contents of the content module for future mining.

A topic page is generated with the identified content modules, as illustrated in operation 430. The order of the content modules is based on weight associated with the content modules and other metadata. Some of the metadata that may be used in ordering the content modules include display size, preferred location, location where the content module should not be placed, content type, author, source, weight, and display flag. The content modules are selected and placed on the topic page based on popularity, metadata and how well the content modules can be brought together to fit into the framework of the topic page.

Each topic page may include related pages. Each of the related pages may provide a link to another topic page with plurality of content modules or to a related website. The related pages are ranked according to the corresponding weight. Session data is used in order to determine the related pages. In order to determine the topic that is most relevant for a query at a particular geo location and to determine the related pages, an algorithm within the module selector is used. The algorithm includes logic that is described herein. The algorithm uses session data of a plurality of users to determine a topic that are popular at a geo location. The session data for each session of a user is analyzed to identify the plurality of queries performed in the session. Session data may be obtained from web search logs maintained at the search engine. Using the identified list of queries, a set of query pairs are generated. Each of the query pairs is used across multiple user sessions for a particular geo location to determine the number of users that used one or more of the query pairs. The results are aggregated across multiple users' respective user sessions to determine the number of times each of the query pairs appears in the user sessions and a scoring function is generated. A user session, as described in this application, is defined to start when a user starts a query and stops when a user logs off or is inactive for a pre-set period of time. In one embodiment, the pre-set period of time for inactivity may be set to 30 minutes. The pre-set period defined is exemplary and should not be considered limiting. The queries within each query set are determined to be somewhat related as the queries are done in a same user session and are done within a short period of time. Based on the data collected from pairs of queries, users choice of topic are determined and content modules, search results, and links to related pages are determined for those topic which match the other dimensions of the query based on the geo location and topic. In addition to the algorithm described above, other algorithms and methods to calculate related pages, such as terms co-occurring in queries or in set of documents, may also be used.

The identified content modules, search results and links to related pages are retrieved and a topic page is generated using the identified content modules, search results and links to related pages, for rendering on the search results webpage. The generated topic page is rendered at the client in response to the query. Upon rendering the topic page, the content modules are analyzed to see if any of the content modules pose a conflict. Some of the content modules returned in the topic page may be irrelevant to the query, rendered incorrectly or have unreliable content. For instance, a movie content module may be rendered on the topic page listing free movies and associated movie information. If a query is received for latest movie information, the movie content module may not have information for the latest movie to render on the topic page. In this instance, the contents of the movie content module are irrelevant to the query. The contents in the content module are dynamically updated periodically. As a result, the contents in a content module in a topic page for a query at a geo location that was relevant at one time may become irrelevant or obsolete at a later time due to the change in the content or due to change in priority or loss of interest in the content for the query at the geo location. In one embodiment, the user may be able to customize the topic page by removing the conflicted content module from the topic page. The conflicted content module may be replaced by some other content module that is relevant to the query or by reconfiguring the content modules in the topic page.

When a conflict is encountered at the topic page, the logic in the topic page generator searches all the sources to identify all content modules related to all the topics identified during the analysis of the query. An analysis of each of the identified content modules is performed to determine which content module has conflict and the type of conflict encountered. Some of the conflicts encountered may include failure of the content module to render when the topic page is rendered on the search results webpage, slow module downloads, heavy content module, poor content quality and heavy content of the topic page. A content module may fail to render for any number of reasons. One of the reasons may be the contents within the content module may be of poor quality or is content rich. Upon identifying the content module that failed to render, the logic in the topic page generator is used to address and resolve the conflict, as illustrated in operation 440. Accordingly, the topic page generator logic flags the display flag of the identified conflict content module so that the conflict content module's display is turned "off". This would ensure that the conflict content module is not rendered on the topic page.

In addition to flagging the display flag of the conflict content module, the topic page generator logic may search the plurality of sources to identify a secondary content module to replace the conflict content module. The original content module is called a primary content module, as the content module is relevant to the query. A secondary content module from either the same source as the primary module or from any other source is defined as a fallback content module (fallback module) as the secondary content module includes content that is relevant to the query but is weighted lower than the primary content module. A plurality of content modules may be defined as fallback modules for the primary content module. The fallback modules are normally not displayed in the topic page as the display flag of these modules are set to "off". A fallback module from the plurality of fallback modules is identified and selected to replace the conflict content module based on the associated weight. Once a fallback module is identified for the conflict content module, the display flag of the identified fallback module is flagged "on" so that the fallback module may be displayed on the topic page instead of the conflict content module. The weight of the fallback module is considered during the generation of the topic page so that the order of the content modules reflects the relevancy of the content modules to the query.

In addition to a failure conflict, the speed of rendering of a content module may cause additional conflict at the topic page during rendering. As in the case of failure conflict, the conflict module with slow rendering speed is identified and is replaced by a fallback module by flagging the display flag of the original content module "off" while flagging the display flag of the fallback module "on" so that the rendering of the topic page is enabled, in one embodiment of the invention. In this embodiment, the replacement of the content module (primary with fallback) and the recalculation of the weights and corresponding updates to the metadata for the corresponding content modules is done dynamically so that the content modules may be presented in the appropriate order in the topic page to reflect the relevancy of the content modules for the query at the geo location.

In one embodiment, the content module with slow rendering speed is moved below a fold of the topic page so that the remaining relevant content modules may be rendered above the fold while the slow content module is still uploading below the fold. This might be due to the fact that the conflict content module includes rich content resulting in the slow rendering of the contents. In this embodiment, the fallback module may not be considered to replace the conflict content module due to the fact that the fallback module is of poor quality or has slow rendering speed, slower than the conflict content module or is non-existent. The moving of the content module within the topic page necessitates rearrangement of the content modules and updates to weights and metadata of the content modules within the topic page so that the updated metadata correctly reflects the relevancy of the content modules for the query at the geo location.

Similarly, if the content of the content module is too content heavy, i.e., the module weight is too content heavy, the content module may be repositioned to the bottom of the topic page or below the fold so that the rendering of the remaining content modules is not adversely affected. Likewise, if the conflict is associated with poor quality of content, the contents of a primary content module may be switched with a fallback content module so that the relevancy of the contents and the quality of the topic page is preserved. As mentioned above with reference to heavy content modules or failed content modules, the weight of the secondary content module is considered to reconfigure the content modules within the topic page and the appropriate metadata updated so that future mining is enabled across all user sessions. Such customizing of the content modules is enabled by the logic within the topic page generator so that only relevant content modules are rendered in the topic page in appropriate order enriching the quality of the contents rendered. The reconfigured topic page is available to all users at the geo location.

Lastly, during the conflict identification and resolution, the overall page content of the topic page is evaluated to determine if the topic page is too content heavy. If the topic page is deemed too content heavy, one or more content modules with module content exceeding a pre-determined threshold are identified and replaced with appropriate fallback modules so that the conflict with the content heavy page is appropriately addressed. In one embodiment, the pre-determined threshold for each content module is set to be between about 150-200 KB. The replacement of the content modules with fallback modules is followed by appropriate adjustment to the corresponding weights and metadata so that the content modules are rendered on the topic page in the order of the weight reflecting the relevancy of the content modules to the query. Thus, by analyzing the content modules in the topic page to identify any conflicts and resolving the conflicts dynamically, the topic page generator logic enables generating a topic page that is most relevant to the query while allowing customization of the contents to ensure quality of the contents within the content modules of the topic page.

In one embodiment, plurality of intents for the query may be obtained using an algorithm disclosed in a related U.S. patent application Ser. No. 11/642,135, filed on Dec. 20, 2006, and assigned to the assignee of the instant application, which is incorporated herein by reference in its entirety. The above algorithm to obtain the plurality of intents should be considered exemplary and not limiting in nature. Other algorithm or ways may be employed to obtain the plurality of intents for the query.

The embodiments of the invention have been described as a dynamic process wherein upon receiving a query, a plurality of dimensions associated with the query are determined, appropriate modules are selected, a topic page generated and rendered at the search webpage dynamically at query request time. It should, however, be noted that the embodiments are not limited to the dynamic processing of the query.

In one embodiment, a batch process is used to implement rendering of a topic page in response to a query. Accordingly, the batch process involves identifying query terms, and pre-processing the query terms. During the batch processing, each query term is processed to identify a plurality of dimensions, select a plurality of content modules, and generate a topic page. Additionally, during the batch processing, the content modules that make up the topic page are saved. In one embodiment, the batch processing can be carried out daily, hourly, or at any other periodic interval. An advantage of batch processing is an improvement in rendering speed of the topic page. The query terms that are selected for batch processing can come from many sources. Examples can include query logs, user logs, session logs, etc. Thus, query terms that are most popular will be found or identified for batch processing. In one example, the batch processing can be carried out during the evening or night. The next day, as users input query terms, if the terms were preprocessed in a batch, the generation and rendering of the topic page will be much more instantaneous. In one embodiment, if the terms were not pre-processed, then the terms may be processed at the time of receiving the search query term from the user. The generated topic page identifies the content modules of the generated topic page and such identification is saved, so future search queries for the same term are expedited in rendering. In other embodiments, the batch processed topic pages and modules are saved together, for even faster rendering.

As noted, the batch process may be run periodically and the selected plurality of content modules for each query may be stored in a repository, such as a module gallery, for future data mining.

Although the current embodiment has been described with respect to search queries, the processing of search queries should be considered exemplary and not limiting. Other types of queries may be processed using the teaching of the present invention.

Although the various embodiments of the invention have been defined with respect to topic page generator, the embodiments of the invention can be extended to serve other areas where content modules are rendered.

Thus, embodiments of the invention provide a tool to generate customized topic page that is rich in content and relevant to the query. The topic page is optimized for a geo location by analyzing the query to identify dimensions and including content modules for topic(s) that are most relevant at the geo location.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a topic page for a query, comprising:
    (a) analyzing the query to identify a geo location and a plurality of dimensions for the geo location, wherein the plurality of dimensions identified from the query includes one or more topics associated with the geo location of the query and one or more intents for the one or more topics, wherein the geo location is identified by one or more of a website location, a user location and a query location, the one or more topics and one or more intents are identified in relation to the identified geo location;
    (b) ranking the plurality of dimensions identified for the geo location, the ranking based on prior user interactions at one or more content modules selected and provided from a plurality of sources associated with the geo location;
    (c) selecting the content modules from the selected ones of the plurality of sources in accordance to the ranking of the plurality of dimensions associated with the geo location, the selected content modules including distinct and recent content retrieved from the respective sources matching the one or more of the plurality of dimensions; and
    (d) generating the topic page with the selected content modules for the geo location, the topic page being generated by arranging the selected content modules in the topic page in accordance to a placement order defined by metadata associated with each of the content modules,
    wherein each of the content modules obtained from a source includes media content matching one or more of the plurality of dimensions of the query, wherein the media content includes dynamic and/or static media content.

2. The method of claim 1, further comprising,
processing as a batch, a plurality of query terms, through operations (a)-(d);
saving identification of the selected content modules for the topic page.

3. The method of claim 2, wherein the batch is processed periodically.

4. The method of claim 2, further comprising,
    receiving a subsequent query;
    if the subsequent query includes one of the plurality of query terms that were processed as the batch, referencing saved identification of the selected content modules to retrieve content for the selected content modules from respective one or more of the plurality of sources for a topic page that is related to the subsequent query, wherein the content for the selected content modules retrieved from the plurality of sources provide most updated information for the subsequent query; and
    presenting the selected content modules in the topic page in response to the subsequent query.

5. The method of claim 2, wherein the plurality of query terms that were processed as the batch are selected from user logs, query logs and session logs, and the plurality of query terms are updated periodically to define new batches of processed query terms.

6. The method of claim 1, wherein selecting content modules further including,
    assigning weight to the one or more content modules based on user interaction from a plurality of users at each of the content modules, the user interactions obtained by mining user logs, query logs and session logs that capture the user interactions, the weight defining ranking of the content modules; and
    identifying the content modules for the query that match the one or more plurality of dimensions based on the associated weight of the one or more content modules.

7. The method of claim 6, wherein generating the topic page further including,
    identifying the weight of the selected one or more content modules; and
    presenting the selected content modules in a topic page template in an order based on the corresponding weight of the content modules, the order indicating relevancy of the content modules to the query, the topic page template stored in a module gallery for future query.

8. A method for generating a topic page for a search query on a search webpage, comprising:
    receiving a query at the search webpage;
    analyzing the query to identify a geo location and a plurality of dimensions for the geo location, wherein the plurality of dimensions identified from the query includes one or more topics associated with the geo location of the query and one or more intents for the one or more topics, wherein the geo location is identified by one or more of a website location, a user location and a query location, the one or more topics and one or more intents are identified in relation to the identified geo location;
    ranking the plurality of dimensions identified for the geo location, the ranking based on prior user interactions at one or more content modules selected and provided from a plurality of sources for one or more of the plurality of dimensions associated with the geo location;
    selecting one or more of the content modules from selected ones of the plurality of sources based on the ranking of the plurality of dimensions identified for the geo location, the selected content modules including distinct and recent content retrieved from the respective sources matching one or more of the plurality of dimensions, the selection of the content modules based on a weight associated with each of the content modules, the weight defining relevant ranking of the content modules; and generating the topic page with the selected content modules for the geo location, the topic page being generated by arranging the selected content modules in the topic page in accordance to an order defined by metadata associated with each of the content modules, the order of presenting of the content modules on the topic page is based on the corresponding weight of the content modules, the order indicating relevancy of the content modules to the query, wherein the geo location drives the selection of the one or more dimensions and the one or more content modules from the plurality of sources and the intent defines a purpose for the query and wherein each of the content modules obtained from a source includes media content matching one or more of the plurality of dimensions of the query, wherein the media content includes dynamic and/or static media content.

9. The method of claim 8, further comprising, actively tracking statistical data at each of the content modules presented in the topic page, the statistical data identifying popularity of the corresponding content modules;

dynamically determining a current weight of each of the content modules from a plurality of sources based on the statistical data, the current weight defining a current ranking of the content modules;

selecting the content modules from the plurality of sources based on the current ranking; and adjusting the content modules presented on the topic page to reflect current selection, the selection and order of presentation of the content modules reflecting the current ranking of the content modules in the topic page.

10. The method of claim 8, wherein each query may be associated with a geo location, a topic and one or more intents for the topic.

11. The method of claim 8, wherein selecting the plurality of content modules includes, weighing each of the content modules for each of the plurality of dimensions based on one or more weighting attributes;

ranking the content modules based on an overall weight associated with each of the content modules for each of the plurality of dimensions; and identifying the content modules with the highest ranking for rendering on the topic page.

12. The method of claim 11, further including selecting one or more content modules with lower ranking as fallback content modules, the fallback content modules used in place of the content modules with higher ranking in the topic page when the content modules with higher ranking encounter problems during the rendering on the topic page.

13. The method of claim 11, wherein the sum of the weights of the content modules in each of the plurality of dimensions is equal to 1.

14. The method of claim 11, wherein the weighting attributes include one or more of credibility of a source providing the content module, relevancy of a source with respect to one or more dimensions, quality of content within the content module, and frequency of updates to a content of the content module.

15. The method of claim 11, wherein the content modules from a plurality of dimensions are combined to match the query, the combination considering the weight of the content modules under each of the plurality of dimensions.

16. The method of claim 9, wherein the statistical data includes one or more of type of user interaction with a content module, number of user interactions with a content module, and number of times a content module gets included in any topic page.

17. The method of claim 16, wherein the user interaction at the topic page includes one or more of adding one or more content modules, removing one or more content modules, re-arranging one or more content modules, wherein the user interaction is associated with customization of the topic page, the customization performed dynamically and is available for the query at the geo location, wherein the customization of the topic page modifying the rankings of the content modules rendered therein.

18. The method of claim 8, wherein the topic page includes one or more links to related content pages, the related content pages obtained using sessions data and ranked according to corresponding weight, the links to the related content pages provided in a navigation bar on the topic page.

19. The method of claim 8, wherein the plurality of dimensions is ranked and selected based on geo location, the ranking and selection based on knowledge of user interactions at the content modules associated with the corresponding dimension and is performed by analyzing user data obtained from user logs, session logs, and query data.

20. The method of claim 8, wherein receiving a query at the search webpage, analyzing the query to identify a plurality of dimensions, selecting one or more content modules from a plurality of sources that match one or more of the plurality of dimensions, and generating the topic page with the selected content modules are performed in a batch process, the batch process performed periodically, wherein the generated topic page is stored in a module gallery for future data mining.

21. A system for generating a topic page for search queries on a search webpage, comprising:

a client configured to generate a query and render the topic page;

a server configured to receive the query from the client, the server including, a topic page generator having, a categorizer module configured to analyze the query and identify a geo location and a plurality of dimensions for the geo location, wherein the plurality of dimensions includes a topic based on the geo location and one or more intents for the topic defining a purpose of the query at the geo location, wherein the geo location is identified by one or more of a website location, a user location and a query location, the topic and one or more intents are identified in relation to the identified geo location;

a module selector configured to rank the plurality of dimensions identified for the geo location based on prior user interactions at one or more content modules selected from a plurality of sources associated with the geo location and to select the plurality of content modules from selected ones of the plurality of sources in accordance to the ranking of the plurality of dimensions for the geo location, the selected plurality of content modules including distinct and recent content retrieved from the respective sources matching the one or more of the plurality of dimensions; and a module placer configured to identify placement of the plurality of content modules in the topic page, the placement of the content modules defined by metadata associated with each of the content modules, wherein each of the content modules obtained from a source includes media content matching one or more of the plurality of dimensions of the query, wherein the media content includes dynamic and/or static media content.

22. The system of claim 21, wherein the topic page generator further includes a module ranker configured to actively track and receive user interactions from the topic page on the client, the user interaction including customization of the topic page, wherein the module ranker uses the user interaction to dynamically rank the content modules and update the rank of the content modules in the metadata of the content modules.

23. The system of claim 21, wherein content modules include dynamic content that are updated periodically at the corresponding source.

24. The system of claim 21, further including a module gallery at each of the plurality of sources for storing one or more content modules, the module gallery associated with a specific geo location.

25. A method for generating a topic page for a search query (query) on a search webpage, comprising:

requesting content modules for a query, the query analyzed to identify a geo location and a plurality of dimensions for the geo location, wherein the plurality of dimensions includes one or more topics associated with the geo location of the query and one or more intents for the one or more topics, wherein the geo location is identified by one or more of a website location, a user location and a query location, the topic and one or more intents are identified in relation to the identified geo location, the plurality of dimensions identified for the geo location of the query are ranked based on prior user interactions at one or more content modules provided for the query at the geo location;

receiving the plurality of content modules matching one or more of the plurality of dimensions of the query, from select ones of the plurality of sources associated with the geo location, wherein the content modules received are selected based on the ranking of the plurality of dimensions; and rendering the content modules on the topic page in response to the request by arranging the selected content modules in the topic page in accordance to a placement order defined by metadata associated with each of the content modules, the rendering of the content modules, the placement order for arranging based on weight associated with each of the content modules, the weight defining ranking of the content modules within the topic page, wherein the rendering further includes identifying and resolving any conflict associated with the content modules and wherein each of the content modules received from a source includes dynamic and/or static media content.

26. The method of claim 25, wherein requesting content modules for a search query further including, analyzing the query received at the search webpage to identify one or more content modules from a plurality of sources associated with the geo location, wherein the identified content modules match one or more of the plurality of dimensions for the geo location.

27. The method of claim 25, wherein each of the content modules is rendered in accordance to metadata defining the rendering attributes of the content module on the topic page, wherein the rendering attributes include one or more of display size, preferred location, location where the content module should not be placed, content type, author, source, weight, and display flag.

28. The method of claim 27, wherein resolving any conflict further including, identifying a content module on the topic page having a conflict that reduces quality of the topic page during rendering, the identification of the content module having conflicts is by analyzing the metadata associated with the content module;

identifying a fallback content module at the source associated with the content module having the conflict; and replacing the content module having the conflict with the identified fallback content module from the source, the replacement redefining the metadata associated with the content module and the fallback content module at the topic page.

29. The method of claim 28, wherein redefining the metadata associated with the content module and the fallback content module further including setting and resetting the display flag associated with the fallback content module and the content module at the topic page.

30. The method of claim 28, wherein the conflict associated with the content module includes one or more of failure to render, slow rendering speed, heavy content for rendering due to rich content, and poor quality for rendering.

31. The method of claim 30, wherein analyzing the plurality of content modules further including, evaluating the conflict associated with a particular content module;

when the conflict associated with the particular content module is one of slow rendering, heavy content due to rich content, lack of fallback content module, or poor quality of fallback content module, re-configuring the topic page by rearranging the content modules contained therein, the rearranging is by moving the content module with the conflict below a fold of the topic page, the re-configuring enabling the topic page to be rendered without conflict, the re-configuring of the topic page resets the metadata associated with the content module.

32. The method of claim 25, wherein identifying the topic for the query further including, obtaining user interactions at a content module rendered on the topic page, the user interaction identifying a source; and identifying a topic category for the content module through a mapping file of the source, the mapping file storing an identity of the source with associated topic, the identity of the source mapped to an identity of the content module to obtain the associated topic of the source.

33. The method of claim 32, wherein when the mapping file does not include an associated topic for the source, the identifying of the topic of the query further including, providing a directory tree of the source, wherein the source is a leaf of the directory tree;

moving up the directory tree to identify a parent node of the source; and identifying a topic category of the parent node to determine the topic category of the source and the content module.

* * * * *